UNITED STATES PATENT OFFICE 2,027,012

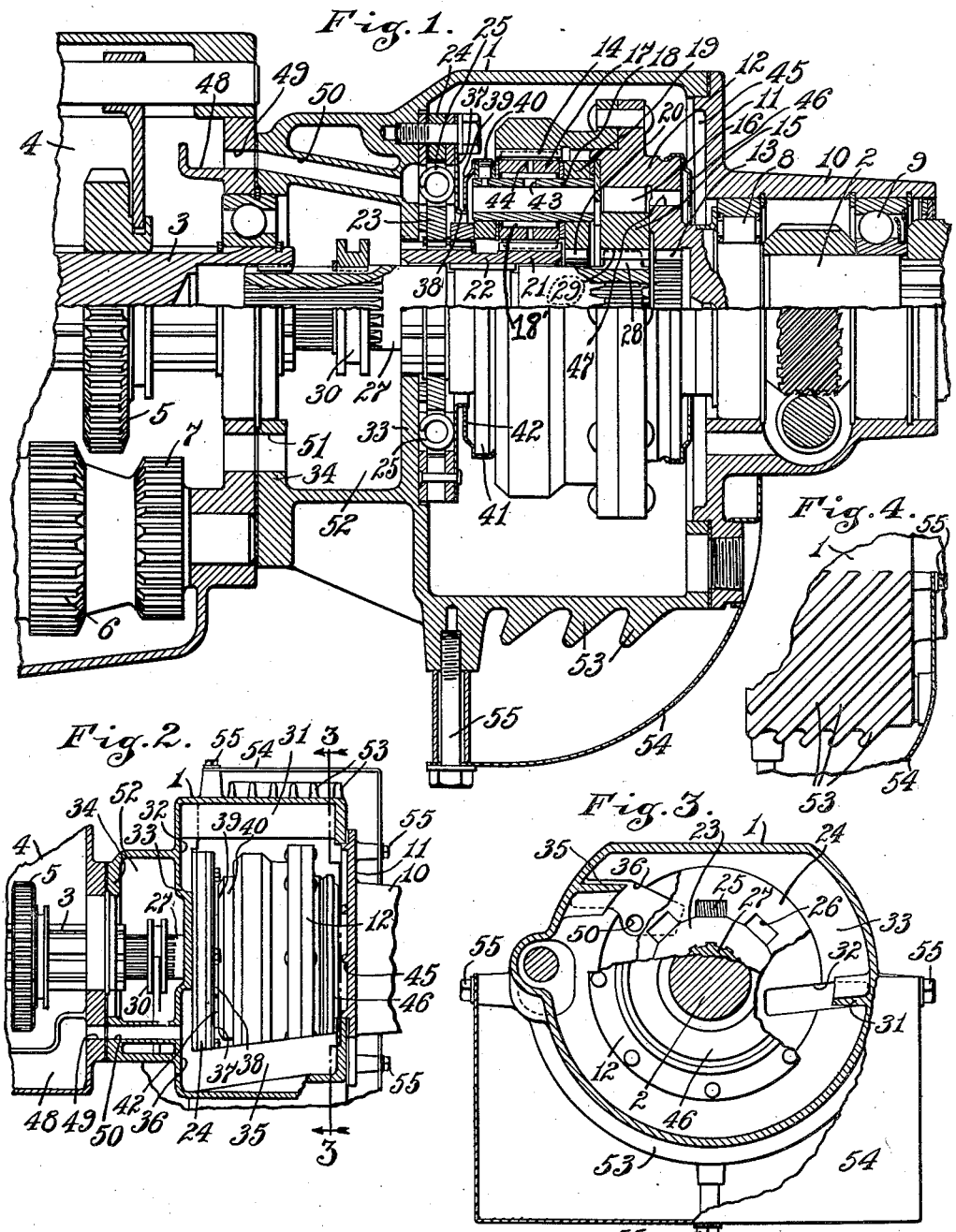

OILING MEANS FOR PLANETARY TRANSMISSION

William B. Barnes, Indianapolis, Ind.

Application August 9, 1933, Serial No. 684,390

8 Claims. (Cl. 184—13)

My invention relates to improvements in automobile transmissions and particularly to a type of transmission which is used for obtaining an overspeed drive for the propeller shaft.

One type of this transmission is adapted for use as a supplement to the regular transmission and is mounted at the rear end of the regular speed changing transmission.

My invention is particularly applicable for lubricating this type of transmission which, in one embodiment, includes a planetary transmission gear for obtaining an overspeed drive, a one-way clutch for obtaining a free wheeling drive, and means for so connecting the parts as to obtain a direct drive, a free wheeling drive, or an overdrive.

In this type of device the planetary gears, in the over-speed drive, operate at very high speed and as a result it is essential to properly lubricate the parts and also desirable, if not absolutely essential, to cool the parts as well as the lubricating oil to prevent over-heating.

It is one of the objects of my present invention to provide a suitable lubricating means for insuring a plentiful supply of oil to all of the parts and to provide means for cooling the oil to thereby reduce heating to the minimum. For the purpose of disclosing my invention I have illustrated one embodiment thereof in the drawing in which:

Fig. 1 is a longitudinal section of a transmission embodying my invention;

Fig. 2 is a plan view thereof partly in section;

Fig. 3 is a transverse section on the line 3—3 of Fig. 2, certain parts being broken away, and Fig. 4 is a detail side elevation of the casing showing the cooling means.

In the particular structure illustrated I have provided a transmission in the form of a supplementary transmission adapted for attachment at the rear end of the regular speed-changing transmission. In constructing this supplementary transmission I provide an enclosing casing 1 into which from one end extends the propeller shaft 2 of the vehicle to be driven and from the other end a driving shaft 3 which is driven through the transmission 4 having the usual speed-changing transmission gears, of which the low-speed gears 5 and 6 and reversing gear 7 are shown.

The driven shaft 2 is mounted in suitable bearings 8 and 9 arranged in an extension 10 of a head 11 of the casing 1. These bearings are properly oil sealed to prevent the escape of oil from the casing 1 through the bearings and the joint between the head 11 and the casing 1 is suitably gasketed to make a tight oil seal at this point. The propeller shaft 2 has mounted thereon within the casing 1 a member which provides one member 12 of an overrunning clutch and with internal teeth 13 of a two-way clutch. This member also has secured thereto a ring gear 14 of a planetary gear train. The inner member 15 of the overrunning clutch is preferably of that type provided with cam surfaces and rollers 16 are interposed between the outer and inner member of the overrunning clutch provide the clutching means.

Meshing with the ring gear 14 of the planetary train are pinion gears 17 mounted on hollow spindles 18 and having interposed between the spindles and the pinion gears needle bearings 18' to reduce friction. The spindles 18 are carried on a pinion carrier 19 provided with internal teeth 20 for a purpose more fully hereinafter to appear. These pinions are also adapted to mesh with a sun gear 21 formed on a sleeve 22 having a toothed engagement with a holding plate 23. This plate is provided with notches which coincide with notches in spaced apart annular plates 24 secured to the housing 1 and coiled springs 25 are disposed in these notches to absorb any vibration set up in the operation of the planetary transmission train and prevent the same from being transmitted to the housing, thus reducing noise in the transmission to the minimum. Certain of these interdigitated fingers are left spaced apart without the interposition of the coiled springs and therefore leave openings such as 26. The advantage of these openings will appear more fully hereinafter.

A supplemental shaft 27 is splinedly connected with the shaft 3 and extends axially through the various parts heretofore described, being provided at one end with engaging radial teeth 28 adapted to engage the teeth 13, the teeth 20, or teeth 29 on the internal member 15 of the overrunning clutch, the arrangement being such that when the teeth 28 are in engagement with the teeth 13 direct drive is effected between the shaft 3 and the shaft 2, locking out the overrunning clutch. When the teeth 28 are in an intermediate position, between the teeth 13 and the teeth 20 the drive from the shaft 3 is through the intermediate shaft 27 and the overrunning clutch to the shaft 2. When the teeth 28 are in engagement with the teeth 20 the shaft 2 is driven at an overspeed through the planetary gear. This supplemental shaft or shiftable member 27 is axially shiftable through the means of a suitable shifting collar 30 operated by any suitable shift rod or shift fork.

In order to insure the delivery of oil to the various parts of the transmission, heretofore described, I provide, on one side of the transmission housing, a fin 31 intermediate of its ends, as shown in Fig. 3, which is approximately midway between the bottom and top of the casing. This fin inclines upwardly and forwardly toward the front end of the casing and terminates in a recess pocket 32 in a front wall 33 of the casing, it being understood that between this front wall 33 and the transmission casing 4 there is a second wall 34. This pocket 32 is in a position to drain through the openings 26 and through the coiled springs 25. The construction is such that with the parts rotating, looking at Fig. 3, in a counterclockwise direction, the oil picked up by the rotating parts will be thrown with considerable force against the under side of the fin 31 and forced upwardly and forwardly along this under side into the pocket 32, whence it will drain back through the openings 26. In addition to the fin 31 I provide on the opposite side of the casing another fin 35 which is near the top of the casing and inclines downwardly from the rear end of the casing toward the front. This fin terminates in a pocket 36 similar to the pocket 32 which likewise drains through the openings 26. The oil which is thrown outwardly and upwardly by the rotation of the parts in the casing and which passes the fin 31 is thrown on top of the fin 35 and flows downwardly and forwardly into its pocket 36. A ring 37, preferably formed of sheet metal, is secured in front of the openings 26, a slight distance therefrom, and the inner portion of this ring is provided with an opening having a rearwardly-extending flange 38. A second ring or flange 39, preferably of sheet metal is flanged over, as at 40, the annular carrier 41 of the pinion gears. The ring portion 42 of this ring overhangs the flange 37, so that the oil flowing into the openings 26 will be guided by the ring 37 out through the center opening thereof and by centrifugal force will be thrown outwardly along the inner face of the ring portion 42. The oil is thus forced through the hollow spindles 18 of the pinions thereby lubricating these parts. Due to the fact that these spindles are provided with openings 43 the lubricant will pass into the needle bearings of the pinions and due to the fact that the pinions are provided with radial openings 44, the oil will also pass up into and lubricate the teeth 14 of the ring gear. A certain amount of this oil will also be forced along the hollow spindle, tending to work into the overrunning clutch and associated parts.

In order to further insure the lubrication of the overrunning clutch radial fins 45 are cast or formed on the inner face of the head 11 and a collector ring or flange 46 is secured onto the head forming a portion of the overrunning clutch. This ring is slightly spaced apart from the head and the head is provided with openings 47 so that as the parts rotate the oil will be splashed against the fins 45 and forced by them, due to the fact that the oil will run down their faces, through the opening in the ring 46 and through the openings 47 into the overrunning clutch. It is therefore apparent that by the above arrangement the centrifugal force of the rapidly rotating parts is taken advantage of to lubricate all of the parts and prevent undue heating.

In view of the fact that this structure is attached on the rear end of the transmission of a vehicle, there is sometimes danger of the operator overlooking the placing of oil in this particular compartment. The tendency would be to see to it of course, that the proper lubricating level in the transmission were maintained but the average owner or oiling mechanic, probably not being particularly familiar with this type of transmission, would just assume that, having filled the main transmission, all lubricating matters were taken care of. I therefore provide means whereby lubricant from the transmission casing is delivered into this overdrive transmission. To this end the transmission casing is provided near its upper end with a trough 48 which terminates in an opening 49 in the rear end of the transmission. This opening is connected by a suitable conduit 50 with an opening in the wall 33 opposite the oil pocket 36. Therefore, as the oil or lubricant in the transmission casing is thrown upwardly by the revolving of the parts in the transmission casing it is picked up in this trough and flows into the supplemental casing. In order to prevent an over-flooding of the supplemental casing I provide a return drain opening 51 in the supplemental and rear wall of the transmission casing, whereby lubricant which will seep into the auxiliary chamber 52 from the main portion of the casing will drain back into the transmission casing.

Even with the above provision for keeping the parts well lubricated I find that there may still be a tendency for the parts to overheat, due to the extreme speed of the planetary gears. To assist in cooling the lubricant I provide on the outer surface of the casing radiating fins 53 which, it will be noted, on the bottom, incline forwardly. These fins also extend up along the side of the casing and, as shown in Fig. 4, incline towards the rear, so that the air in striking the ribs will flow upwardly and rearwardly and in order to collect the air during the movement of the car or vehicle I provide a scoop which may be of sheet metal as at 54, which surrounds the lower portion of the transmission, being open at its front and top and supported in position by bolts 55 secured into the casing. It is therefore apparent that as the vehicle is moving forward the air will be scooped up by this scoop 54 and caused to flow upwardly and rearwardly over the radiating fins.

I claim as my invention:

1. In a device of the character described, the combination with a casing, of a rotating member in said casing including planetary pinions mounted on bearings requiring lubrication, a lubricant conduit extending into each of said bearings and parallel with the axis of said member, an annular ring mounted on said rotating member and overhanging the ends of said bearings, a stationarily mounted shield having a central opening, a flange on said shield surrounding said opening and entering said ring, and means for conveying lubricant picked up by said rotating member within said casing on one side of said shield to the opposite side of said shield, the lubricant thus conveyed flowing through the opening in said shield into said annular ring.

2. In a device of the character described, the combination with a casing, of planetary gearing in said casing including a rotating member and planetary pinions mounted on bearings requiring lubrication, a conduit extending parallel with the axis of said member from the exterior thereof into said gearing, a ring secured to said rotating member and having a portion overhanging the inlet end of said conduit, a shield stationarily secured to one wall of said casing and spaced apart therefrom, having a central opening therein, an annular flange surrounding said opening and projecting into said ring and means for conveying the lubricant picked up by said rotating member within said casing on one side of said shield to the opposite side of said shield, the lubricant thus conveyed flowing through the opening in said shield into said annular ring.

3. In a device of the character described, the combination with a casing, of a planetary gear mechanism rotatably mounted in said casing and including pinions mounted on bearings, conduits extending through the axis of said bearings, a ring mounted on said gear mechanism and overhanging the entrance to said conduits, a shield secured to said casing and spaced apart therefrom and having a central opening therein, an annular flange surrounding said opening and projecting into said ring and fins mounted on the side walls of said casing adapted to collect the lubricant splashed by the rotation of said planetary gear on one side of said shield and deliver the same to the opposite side of said shield, the lubricant thus conveyed flowing through the opening in said shield into said annular ring.

4. In a device of the character described, the combination with a casing, of a planetary gear rotatably mounted in said casing, hollow spindles for the pinion gears having radial openings therein and radial openings in the gears extending to the periphery thereof, a pinion gear carrier, a ring secured on said pinion gear carrier and rotatable therewith and overhanging the ends of said spindles, a shield stationarily mounted on said casing and spaced apart from one wall thereof, having a central opening therein, a flange surrounding said opening and projecting into said ring, and means for conveying lubricant picked up by a rotating member of said planetary gear on one side of said shield to the opposite side of said shield, the lubricant thus conveyed flowing through the opening in said shield into said annular ring.

5. In a device of the character described, the combination with a casing, of a rotating member including planetary pinions mounted on bearings requiring lubrication, a lubricant conduit extending into each of said bearings and parallel with the axis of said member, an annular ring mounted on said rotating member and overhanging the ends of said bearings, a stationarily mounted shield adjacent said ring having an annular flange entering said ring, said shield having an opening extending therethrough within the periphery of said flange and from one side to the other, and means for conveying lubricant picked up on one side of said shield by said rotating member within said casing to the opposite side of said shield, the lubricant thus conveyed flowing through said opening into the annular ring.

6. In a device of the character described, the combination with a casing, of a rotary member including planetary pinions mounted on bearings requiring lubrication mounted within said casing, a lubricant conduit extending into each of said bearings and parallel with the axis of said member, an annular ring mounted on said rotating member and overhanging the ends of said bearings, a stationarily mounted shield adjacent said ring having an annular flange entering said ring, said shield having an opening extending therethrough within the periphery of said flange and from one side to the other, and means for delivering lubricant to the side of said shield opposite the flange, said lubricant flowing through the opening into the annular shield.

7. In a device of the character described, the combination with a casing, of a planetary gearing mounted in said casing including a ring gear, a stationarily mounted sun gear, pinion gears nested between said ring and sun gears, pinion shafts for said pinion gears, lubricant conduits extending through said shafts to the interior of said gearing, an annular ring mounted to rotate with said pinion shafts and overhanging one end of said conduits, a shield having an annular flange extending into said ring and having an opening within the periphery of said flange and extending from one side of said shield to the other, and means for delivering lubricant to that side of the shield opposite from said flange, said lubricant flowing through said opening and into said ring, and from thence through said conduits to the interior of said planetary gearing.

8. In a device of the character described, the combination with a casing, of a planetary gearing mounted in said casing including a ring gear, a stationary sun gear, planet pinions nesting said ring and sun gears, pinion shafts for said pinions, conduits extending through said pinion shafts to the interior of said planetary gearing, an annular ring mounted to rotate with said pinion shafts and overhanging the ends of said conduits, a shield having an annular flange extending into said ring, and an opening within the periphery of said flange extending from one side of the shield to the other and means for conveying the lubricant picked up by the rotation of said planetary gearing on one side of the shield, said shield to the opposite side of the shield, said lubricant flowing through said opening into said ring.

WILLIAM B. BARNES.